Oct. 4, 1938.   C. F. HELMIG   2,131,949
MACHINERY CARRYING TRAILER
Filed Nov. 26, 1937   4 Sheets-Sheet 1
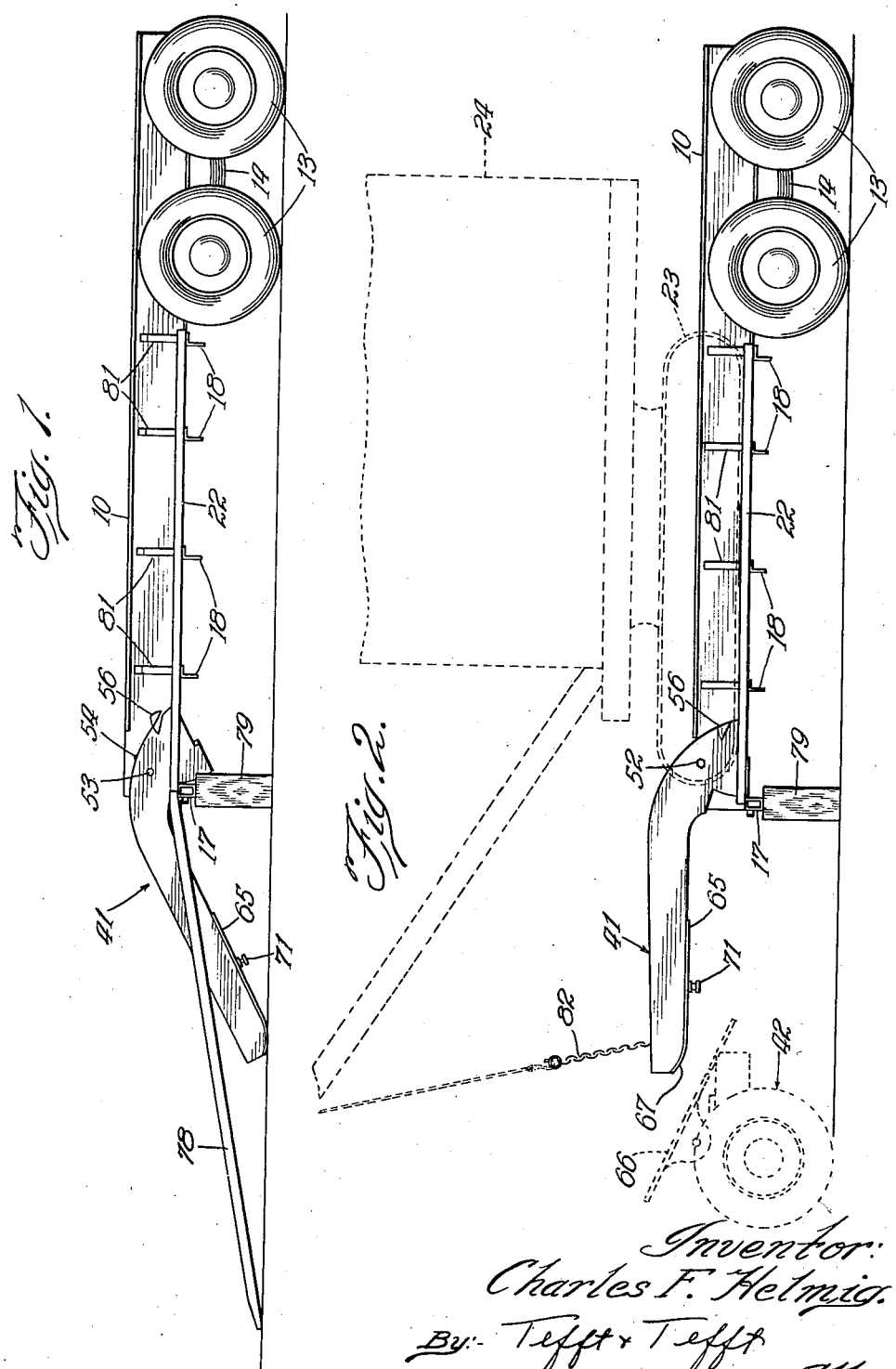

Oct. 4, 1938.   C. F. HELMIG   2,131,949
MACHINERY CARRYING TRAILER
Filed Nov. 26, 1937     4 Sheets-Sheet 2

Inventor:
Charles F. Helmig
By- Tefft + Tefft
Attys.

Oct. 4, 1938.   C. F. HELMIG   2,131,949
MACHINERY CARRYING TRAILER
Filed Nov. 26, 1937    4 Sheets-Sheet 3
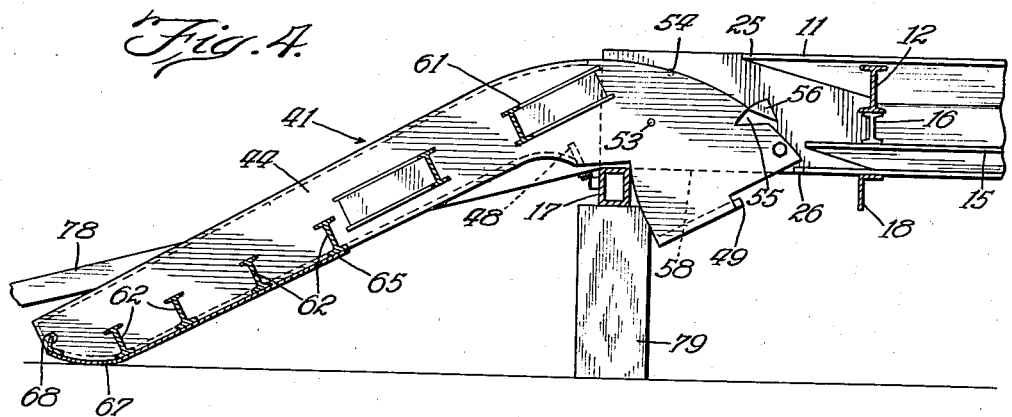
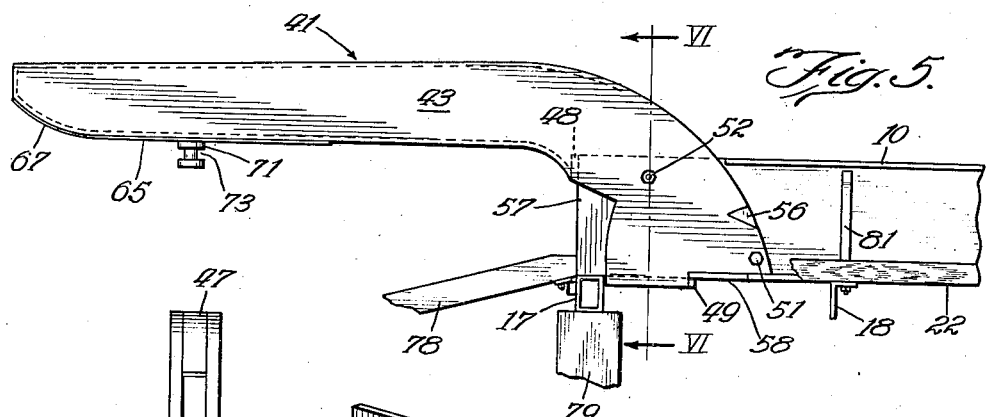
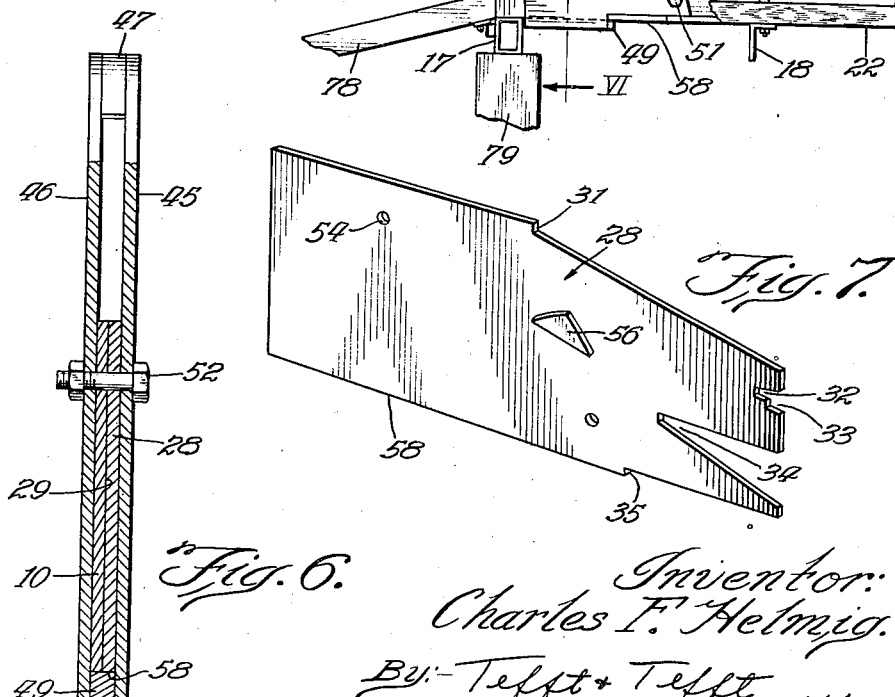

Oct. 4, 1938.　　　C. F. HELMIG　　　2,131,949
MACHINERY CARRYING TRAILER
Filed Nov. 26, 1937　　　4 Sheets-Sheet 4
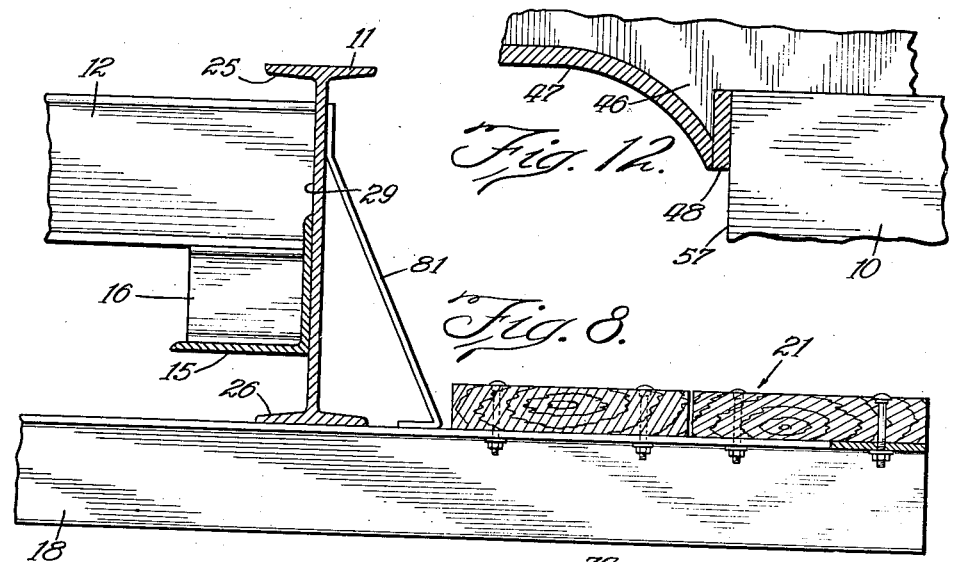
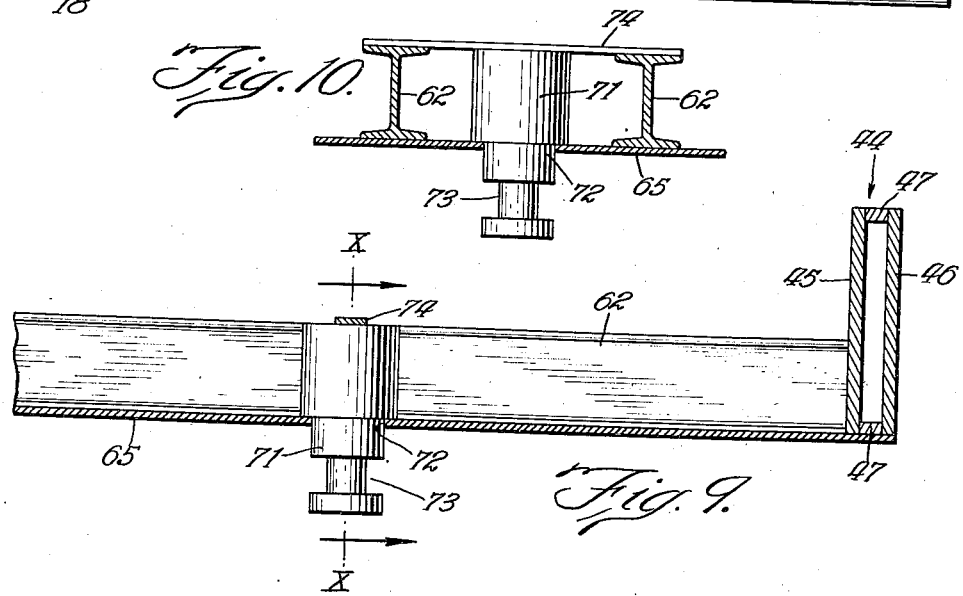
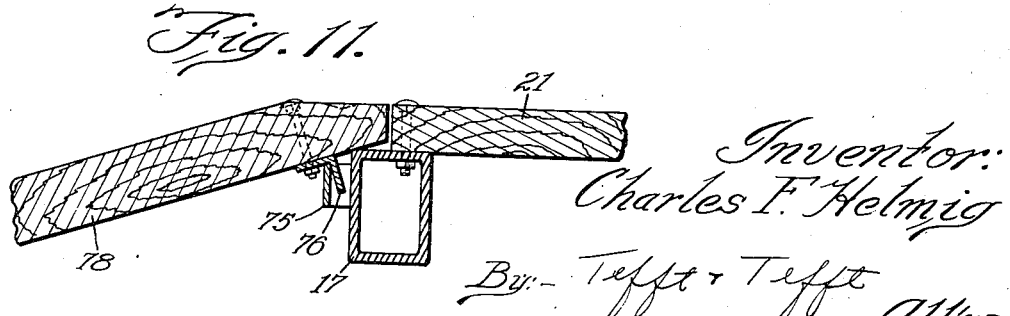
Inventor:
Charles F. Helmig
By Tefft + Tefft
Attys.

Patented Oct. 4, 1938

2,131,949

UNITED STATES PATENT OFFICE 2,131,949

MACHINERY CARRYING TRAILER

Charles F. Helmig, Pekin, Ill.

Application November 26, 1937, Serial No. 176,407

16 Claims. (Cl. 214—85)

This invention concerns automotive trailers, and more particularly such trailers adapted to transport heavy machinery, as for example, excavating machinery.

Ordinarily a power shovel or excavator is equipped with an engine adapted to perform the double function of operating the shovel when in use and of moving the shovel under its own power, but due to the fact that the traction members of such machines are usually of the caterpillar type or a similar type designed to secure maximum traction at a very low rate of speed, it is not feasible to attempt to move such a machine over any distance under its own power.

This is true not only because of the loss of time incurred, but because of the additional and unnecessary wear upon the machine, and unnecessary consumption of fuel incident to such a procedure. Probably more important than either of these reasons, however, is the fact that certain state traffic laws forbid the operation of such machines on the principal highways, both because of the fact that such operation tends to obstruct the roadway, block bridges, etc., and because the cleats or other metallic parts of their traction members injure the surface of the paving.

It is therefore necessary to use some type of pneumatic trailer as a means of transporting machines of this type, but heretofore such trailers have been objectionable in that their height raised the machine being carried to such an extent that the usual clearances allowed beneath viaducts, railway underpasses and similar structures was insufficient to clear the machine. Even when such difficulties are not encounered, the high center of gravity of the machine renders such a conveyance somewhat precarious, particularly over rough roads or at relatively high speeds.

In this connection it should be noted that the loads being carried are very great and that satisfactory service cannot therefore be secured unless relatively large heavy duty tires are provided. As a consequence of this, the load carrying platforms are ordinarily positioned above the extreme height of the tires in such a manner that an excavator may be driven up the ramps at the rear of the trailer, over the wheels, and into position upon the platform. Ordinarily it has not been possible to load from the front, since the tractor-hitch constituted an obstruction of even greater height than the wheels.

Certain attempts have been made to overcome the difficulties outlined above as by trailers of abnormally wide gauge, such that the platform could be suspended between the wheels, but due to the abnormal width of such vehicles these are illegal for use on highways and therefore unsatisfactory.

It is therefore, a primary object of this invention to provide a standard gauge trailer having a relatively low center of gravity.

Another object is to provide a trailer having its weight supporting platform in alignment with but below the plane of its wheels.

Another object is to provide a trailer having its weight supporting platform suspended between trailer wheels at the rear and an independent tractor unit at the front, and having a tractor-hitch bracket movable to permit loading of the trailer from the front.

A further object is to provide a trailer having frame members adapted to prevent lateral displacement of the load.

These and other important objects are accomplished in the present invention by providing a trailer frame having pneumatic tires at the rear end and a movable bracket at the front, which is adapted to be engaged and carried by an independent pneumatic tire tractor unit in a manner well known in the art. The framework is relatively narrow and is provided with a pair of runways on either side adapted to support the caterpillar chain or other traction members of the machine being carried, while the frame members themselves are accommodated by the clearances provided between such traction members and effectively prevent any lateral displacement of the loaded machine.

Since the runways are preferably in alignment with and at lesser elevation than the wheels, it is desirable to be able to load the machine to be carried on the trailer from the forward end. This is readily accomplished by blocking up the forward end of the trailer and disengaging the independent tractor unit, after which the movable supporting bracket may be lowered to permit the excavator or other machine to be driven up removable ramps onto the runways. The movable bracket may then be lifted and the independent tractor unit backed into engaging position, when it will operatively engage the trailer and lift it from the supporting blocks.

Referring more particularly to the drawings,

Fig. 1 is a side elevation of the trailer in loading position.

Fig. 2 is a side elevation similar to Fig. 1 but having the various parts shown in the positions that they assume when the trailer is being coupled to a tractor unit.

Fig. 4 is a detailed sectional view of the tractor hitch bracket taken on the line IV—IV in Fig. 3.

Fig. 5 is a fragmental side elevation of the tractor hitch bracket with parts thereof being shown in their operative position.

Fig. 6 is a detailed sectional view of a side plate assembly taken on the line VI—VI in Fig. 5.

Fig. 7 is a detailed perspective view of a re-enforcing plate.

Fig. 8 is a detailed sectional view taken on the line VIII—VIII in Fig. 3.

Fig. 9 is a detailed sectional view of the tractor hitch pin taken on the line IX—IX in Fig. 3.

Fig. 10 is a detailed sectional view of the tractor hitch pin taken on the line X—X in Fig. 9.

Fig. 11 is a detailed sectional view of the loading ramp retaining means taken on the line XI—XI in Fig. 3, and Fig. 12 is a detailed sectional view taken on the plane of the line XII—XII in Fig. 3.

Figure 3:
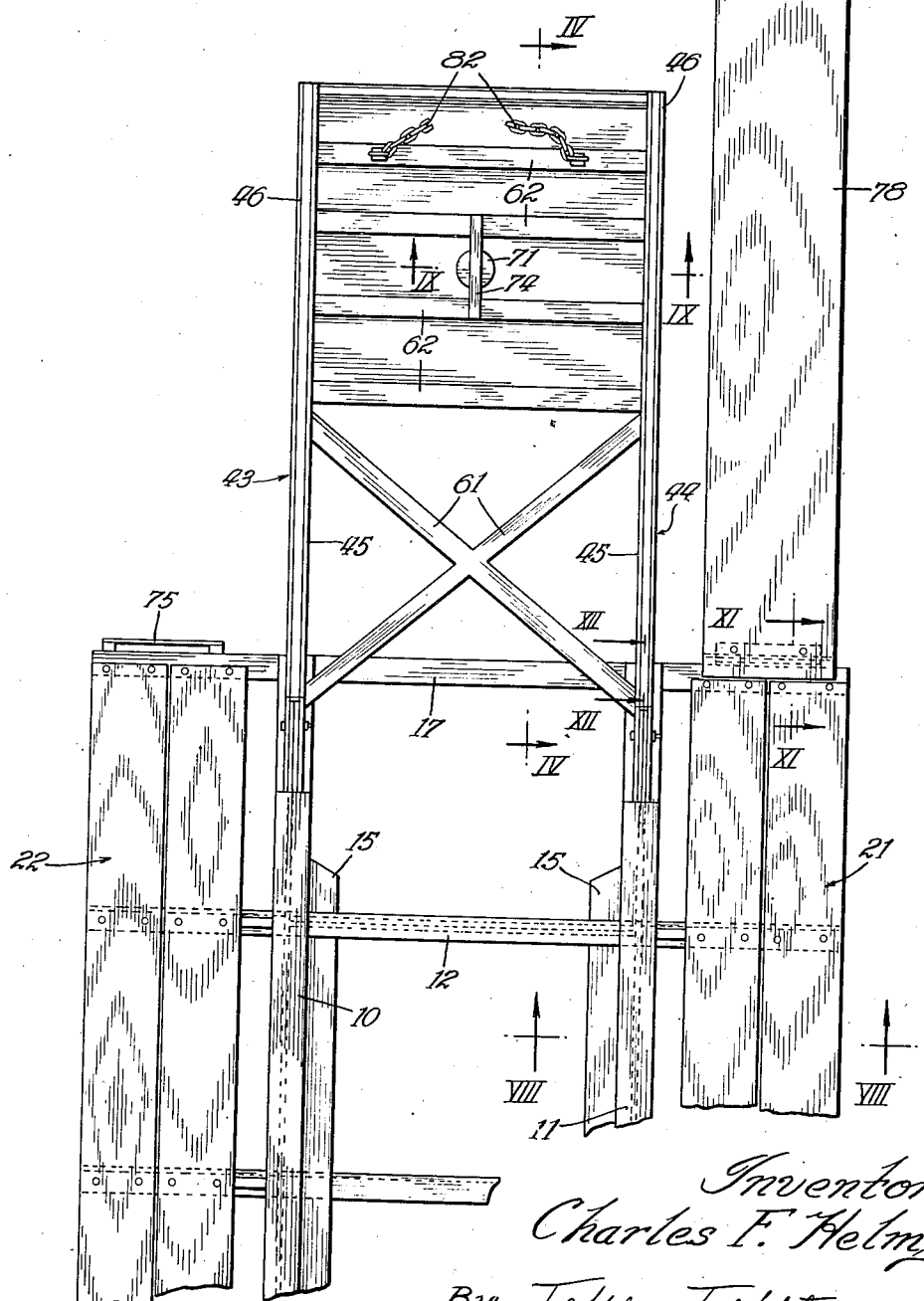
Fig. 3 is a fragmental top plan view showing one of the loading ramps removed.

In the form of the invention illustrated in the drawings the trailer frame comprises a pair of longitudinal beams 10 and 11 and a plurality of transversely extending beams 12 welded thereto. Adjacent the rear ends of the beams 10 and 11 pairs of wheels 13 are provided. These wheels 13 may be mounted upon the springs 14 and thus serve to support the rear end of the trailer frame. Inasmuch as the mounting and detailed construction of these wheels 13 and springs 14 form no part of the present invention, it is believed not necessary that this construction be described in detail. It should be stated, however, that these wheels are preferably equipped with pneumatic tires and air brakes in a manner well understood in the art.

On the inner surface of each of the beams 11 and 12 a bracing plate or angle iron 15 is provided, and this plate 15 is preferably welded to the beam and also welded to a filler 16.

At the extreme forward end of the beams 10 and 11 a cross bar 17 is provided which is of sufficient length to extend somewhat beyond the trailer frame on either side. Angle irons 18 are provided at spaced intervals along the beams 11 and 12 and are likewise welded thereto and of sufficient length to extend a predetermined distance on either side of the trailer frame.

On each side of the frame a pair of planks are bolted to the extending portions of the angle irons 18 and cross bar 17 in order to form runways 21 and 22. These runways 21 and 22 serve to support the traction members 23 of the excavator 24 or of any other machine that may be carried by the trailer. It should be noted that these runways 21 and 22 are substantially in alignment with the wheels 13, but since they are supported from the lower surfaces of the longitudinal frame members 10 and 11, they are positioned in a plane considerably below the top of the wheels 13.

Each of the longitudinal frame members 11 and 12 has a portion of its upper flange 25 and lower flange 26 removed at its forward end and each is provided with a re-enforcing plate 28 which is welded in position against the inner flat face 29 of the beam.

Each of the re-enforcing plates 28 is provided with a notch 31 adapted to engage the upper flange 25 of the beam, a notch 32 adapted to engage the lower flange of the foremost of the transversely extending beams 12, a notch 33 adapted to engage the upper flange of the filler 16, a notch 34 adapted to engage the forward end of the plate 15 and a notch 35 adapted to engage the lower flange 26 of the beam. By thus fitting the re-enforcing plates 28 into position they may be welded to each of the members just mentioned and thus unite the various pieces of the frame into one unitary structure. Re-enforcing plates 28 are provided in order to facilitate the mounting of a tractor hitch bracket 41 by which the forward end of the trailer may be engaged by and carried by a tractor unit 42 in a manner well understood in the art. The tractor hitch bracket 41 comprises a pair of side plate assemblies 43 and 44 each of which is pivotally mounted upon the forward end of the longitudinal beams 10 and 11, respectively. Each of these side plate assemblies 43 and 44 comprises an inner plate 45 and an outer plate 46 separated by spacers 47, 48 and 49 which are preferably welded into place. Each of these plate assemblies is assembled upon the forward end of its respective beam in such a manner that the flat portion of the beam 10 and its re-enforcing plate 28 are positioned between the inner plate 45 and the outer plate 46 of the side plate assembly. A bolt 51 extends through the plates 45 and 46, the beam 10 and the plate 46 and permits the side plate assembly 41 to pivot between the positions shown in Fig. 4 and that shown in Fig. 5. A bolt 52 is preferably provided in such a manner that it may be inserted through the holes 53 in the plates 45 and 46 and through the holes 54 in the beam 10 and re-enforcing plate 28 in order to plant the plates 45 and 46 against the beam 10 and re-enforcing plate 28 and thus lock the tractor hitch bracket in its operative position as shown in Figs. 2, 5 and 6. A notch 55 is provided in each of the plates 45 and 46 and an angular block 56 is welded into position on the inner surface of each of the re-enforcing plates 28 and on the outer surface of each of the beams 10 and 11.

It will readily be seen from an examination of Figs. 4 and 5 that when the tractor hitch bracket 41 is moved from its inoperative position as shown in Fig. 4 to the opposite position as shown in Fig. 5, it will pivot above the bolts 51 until the notches 55 engage the angular blocks 56. At this time it should be noted that the spacers 48 will have engaged the front surface 57 of the beams 10 and 11 and the spacers 49 will have engaged the lower surfaces 58. The holes 53 and 54 will now be in alignment in such a manner that the bolts 52 may be secured in place, but it should be noted that the blocks 56 and the spacers 48 and 49 have served to lock the tractor hitch bracket against further rotation with respect to the trailer frame and that there is, therefore, no shearing action or strain exerted upon either the bolts 51 or the bolts 52.

A pair of cross beams 61 are welded into position between the side plate assemblies 43 and 44 and a plurality of relatively small I-beams 62 are welded into position between the assemblies 43 and 44 in order to support an upper bearing plate 65 which is adapted to engage a lower pivoted bearing plate 66 of any suitable type carried by the tractor unit 42.

The upper bearing plate 65 is provided with an angular cam surface 67 supported by an angle iron 68 extending between and welded to the side plate assemblies 43 and 44. A tractor hitch pin 71 extends through an opening 72 in the upper bearing plate 65 and is provided with a groove 73 adapted to be engaged by any well-known coupling mechanism associated with the lower bearing plate 66 of the tractor unit 42. The brace 74 is welded to the tractor hitch pin 71 at its upper end and extends between two of the I-beams 62 in such a manner as to secure the pin 71 against displacement.

At each end of the cross bar 17, a strap anchor 75 is provided which is adapted to engage an angle iron hook 76 bolted to the lower surface of a loading ramp. One of the loading ramps extends forwardly from and in substantial alignment with each of the runways 21 and 22.

In the operation of the device, a pair of blocks 79 are positioned below the cross bar 17 and serve to support the forward end of the trailer frame including the longitudinal beams 10 and 11, transverse beams 12, transverse angle irons 18 and the runways 21 and 22. The weight of the rear end of the frame is, of course, supported by the pneumatic tired wheels 13 and springs 14 in the usual manner. One of the loading ramps 78 is secured in position co-extensive with each of the runways 21 and 22 by means of the angle iron hook 76 engaging the anchor strap 75 carried by the cross bar 17.

At this time the tractor hitch bracket 41 is allowed to move downwardly into its inoperative position and all parts are in the position they assume in Fig. 1. At this time an excavator or other machine to be conveyed may be driven up the incline loading ramps 78 and onto the runways 21 and 22 under its own power.

In machinery of this type, there is considerable clearance between the traction members and this clearance is sufficient to accommodate the frame members 10 and 11.

A series of guide bars 81 is provided along the outer face of each of the longitudinal beams 11 and 12 and each of these guide bars 81 extends angularly downward and outward toward the runway 21 or 22. Thus in the event that the tractor members 23 of the excavator are not properly guided by means of their own steering mechanism, they will engage the guide bars 81 which will exert a camming action, thus moving the traction members 23 into their proper position upon the runways 21 and 22.

The loading ramps 78 may now be removed from their loading position and the tractor hitch bracket 41 should be raised to its operative position (as illustrated in Figs. 2 and 5) where it may be secured by inserting the bolt 52 through the bolt holes 53 and 54, as hereinbefore described. Any desired means may be utilized for raising the tractor hitch bracket 41 into this position, but it has been found very convenient to utilize the hoisting mechanism of the excavator 24 for this purpose and to this end a loop of chain 82 is welded to one of the I-beams 62.

An independent tractor unit 42, which may be of any conventional type, may now be backed into position below the tractor hitch bracket 41 in such a manner that the pivoted lower bearing plate 66 will engage the cam surface 67 of the upper bearing plate 65 and thus force it upwardly as the pin 71 is being engaged. This action will be effective to raise the forward end of the trailer frame sufficiently to remove the load from the blocks 79 and the trailer is, therefore, in a position for travel.

It should be appreciated that during the engaging operation longitudinal movement of the trailer is prevented by means of the brake mechanisms associated with the wheels 13, but since this method of engagement is common practice in the art, it is believed unnecessary to describe in any greater detail.

When it is desired to unload the machine being carried, it is, of course, only necessary to replace the blocks 79, lock the brakes associated with the wheels 13, release the pin 17 from its engaging mechanism and drive the independent tractor unit 42 forwardly until the bearing plates 66 and 67 have disengaged. The bracket 41 may then be lowered, the ramps 78 placed in their proper positions and the excavator 24 driven from the runways 21 and 22 down the ramps 78 and out of the ground under its own power.

From the above it will be seen that the mechanism here described is highly advantageous in that it permits a machine of this type to be carried with a relatively low center of gravity since it is unnecessary to raise the traction elements any greater distance above the ground than is required for practical road clearance.

While I have described the preferred embodiment of the invention, it is intended to be illustrative only and I, therefore, do not wish to be limited except as by the scope of the appended claims.

I claim:

1. A trailer comprising a frame, runways supported by said frame, a hitching structure normally positioned above the plane of said runways, and means for relatively moving said hitching structure and said frame whereby said hitching structure may be moved to an inoperative position below the plane of said runways.

2. A trailer comprising a frame, runways supported by said frame, wheels extending above the plane of said runways, a hitching structure normally positioned above the plane of said runways, and means for relatively moving said hitching structure and said frame whereby said hitching structure may be moved to a position below the plane of said runways.

3. A trailer comprising a frame, runways supported by said frame, wheels extending above the plane of said runways and in substantial alignment therewith, a hitching structure normally positioned above the plane of said runways, and means for relatively moving said hitching structure and said frame whereby said hitching structure may be moved to a position below the plane of said runways.

4. A trailer comprising runways, loading ramps contiguous with said runways, frame members substantially above the plane of said runways, and pivotally mounted frame extension members movable to a position below the plane of said loading ramps.

5. A trailer comprising runways, wheels extending above the plane of said runways, frame members supported by said wheels, supporting said runways and being positioned substantially above the plane of said runways, loading ramps contiguous with said runways, and pivotally mounted frame extensions adapted to extend below the plane of said loading ramps.

6. A trailer comprising a frame, runways adapted to support traction members of a vehicle, wheels in substantial alignment with said runways and extending above the plane established thereby, loading ramps contiguous with said runways and establishing a path of movement of a vehicle during the operation of loading and unloading, a hitch member normally positioned within said path, means for supporting said trailer frame from said hitch member during operation of the trailer, means for supporting said trailer frame independently during the loading operation of the trailer, and means for removing said hitch member from the path of movement of the vehicle during the loading operation.

7. A trailer comprising frame members, wheels supporting said frame members, runways positioned forwardly of and below the plane of the upper surface of said wheels, loading ramps extending longitudinally from said runways, and means for hitching said trailer to a power vehicle said hitching means comprising an upwardly offset frame extension carrying a substantially horizontal bearing plate, a lifting cam portion extending angularly upwardly therefrom, and a pivotal hitching pin.

8. A trailer comprising frame members, wheels supporting said frame members adjacent their rear end, a tractor hitch bracket supporting said frame members adjacent their front end, and runways supported by the frame and positioned between the wheels and the tractor hitch bracket, said runways being in substantial alignment with and below the plane of the upper surface of said wheels.

9. A trailer comprising longitudinally extending frame members, wheels supporting said frame members adjacent their rear end, a movable tractor hitch bracket supporting said frame members adjacent their front end, and runways supported by the frame at a point intermediate between the wheels and the tractor hitch bracket and in substantial longitudinal alignment with the wheels, said runways being at a lesser elevation than the upper surface of said wheels.

10. A trailer including a longitudinally extending runway, a raised center portion of said runway, supporting wheels in longitudinal alignment with said runway at one end and extending above the plane established thereby, a hitch bracket in longitudinal alignment with said runway at its opposite end and extending above the plane established thereby, and a loading ramp extending angularly downward from said runway.

11. A trailer including a pair of runways, a frame positioned between said runways and extending above the upper plane thereof, wheels in longitudinal alignment with said runways and supporting said frame, an upwardly offset frame extension extending above the plane of the frame and including a disengagable hitching means comprising a hitching pin and bearing structure adapted to support one end of said frame, and means for pivoting said frame extension downwardly about a horizontal axis.

12. A trailer including a pair of runways, a frame positioned between said runways and extending above the upper plane thereof, wheels adapted to support one end of said frame and positioned above the plane of the runways and in longitudinal alignment therewith, an upwardly offset frame extension adapted to support the opposite end of said frame, means for pivotally moving said frame extension about a horizontal axis, means for limiting the upward pivotal movement of said frame extension, and means for clamping said frame extension into rigid association with said main frame.

13. A trailer including a pair of runways, a frame positioned between said runways and extending above the upper plane thereof, wheels adapted to support one end of said frame, an upwardly offset frame extension adapted to support the opposite end of said frame, means for pivotally moving said frame extension about a horizontal axis, means for limiting the upward pivotal movement of said frame extension, hitching means comprising a pivot pin at the forward end of said frame extension, and a cam surface extending upwardly from said hitching means.

14. A trailer including a frame, a longitudinally extending runway, supporting wheels in longitudinal alignment with said runway at one end and extending above the plane established thereby, an upwardly offset frame extension in longitudinal alignment with said runway and extending above the plane established thereby, a loading ramp in longitudinal alignment with said runway, means for pivotally moving said frame extension below the plane of the frame, and a disengageable hitch mechanism comprising a pivot pin positioned on said frame extension.

15. A trailer including a frame; a pair of longitudinally extending runways positioned on either side of said frame and below the upper plane thereof, wheels adapted to support said frame and positioned at one end thereof in longitudinal alignment with said runways and extending above the plane established thereby, an upwardly offset frame extension adapted to support one end of said frame, said frame extension being positioned in longitudinal alignment with and above the plane established by the main frame, a pair of loading ramps in longitudinal alignment with the aforementioned runways and extending angularly downwardly therefrom, thus establishing a path of movement of a vehicle during the loading operation, means for pivotally moving the said frame extension into and out of the path of movement established by the loading ramps, means for limiting the upward pivotal movement of said frame extension, and a disengageable hitching means carried by said frame extension.

16. A trailer comprising spaced apart runways, pneumatic tired wheels extending above the plane of said runways, frame members supported by said wheels, supporting said runways and being positioned substantially above the the plane of said runways, detachable loading ramps contiguous with said runways, pivotally mounted frame extensions adapted to extend below the plane of said loading ramps, means for limiting the pivotal movement of said frame extensions, and means for securing said frame extensions against such pivotal movement.

CHARLES F. HELMIG.